United States Patent
Bachorski et al.

(10) Patent No.: US 6,772,487 B2
(45) Date of Patent: Aug. 10, 2004

(54) RETAINER CLIP

(75) Inventors: Ronald M. Bachorski, Glen Ellyn, IL (US); Philip D. Keeley, Darien, IL (US)

(73) Assignee: International Engine Intellectual Property Company, LLC, Warrenville, IL (US)

(*) Notice: Subject to any disclaimer, the term of this patent is extended or adjusted under 35 U.S.C. 154(b) by 0 days.

(21) Appl. No.: 10/292,827

(22) Filed: Nov. 12, 2002

(65) Prior Publication Data

US 2004/0088837 A1 May 13, 2004

(51) Int. Cl.[7] .............................................. A44B 17/00
(52) U.S. Cl. .................... 24/581.1; 24/615; 24/DIG. 52
(58) Field of Search .......................... 24/614, 615, 625, 24/573.09, 581.11, DIG. 52, 581.1; 439/352–354, 834, 858, 861

(56) References Cited

U.S. PATENT DOCUMENTS

| | | | | |
|---|---|---|---|---|
| 4,580,192 A | * | 4/1986 | Beun .......................... 361/736 |
| 4,634,204 A | * | 1/1987 | Detter et al. ................. 439/347 |
| 4,746,306 A | * | 5/1988 | Yurtin et al. ................. 439/357 |
| 4,946,404 A | * | 8/1990 | Takenouchi et al. ......... 439/352 |
| 5,035,637 A | | 7/1991 | Mathews et al. |
| 5,624,271 A | * | 4/1997 | Childs et al. ................ 439/352 |
| 5,651,689 A | * | 7/1997 | Plyler et al. ................. 439/352 |
| 5,759,058 A | * | 6/1998 | Childs et al. ................ 439/352 |
| 5,910,028 A | * | 6/1999 | Tsuji .......................... 439/489 |
| 6,435,895 B1 | * | 8/2002 | Fink et al. ................... 439/352 |
| 6,544,066 B2 | * | 4/2003 | Fukase ........................ 439/352 |
| 2002/0123261 A1 | * | 9/2002 | DeWitt et al. .............. 439/352 |

OTHER PUBLICATIONS

"International® T444E Diesel Engine, Model Year 1994–1998," Diesel Engine Service Manual, Publ. No. EGES–120, Graphics EG–3365 and EG–3518.

* cited by examiner

Primary Examiner—James R. Brittain
(74) Attorney, Agent, or Firm—Dennis Kelly Sullivan; Susan L. Lukasik; Jeffrey P. Calfa

(57) ABSTRACT

A retainer clip for use in assemblies held together by a latch having a resilient engagement arm. The force holding the engagement arm in the latched position is a function of the resiliency of the material of the engagement arm and the length of the unsupported portion of the engagement arm. The retainer clip attaches to a part of the assembly by holding the part between a retaining lip and an engagement side to position the retainer clip to bear against the engagement arm. The retainer clip supports the engagement arm to shorten the length of the unsupported portion of the engagement arm thereby increasing the force holding the engagement arm in the latched position.

8 Claims, 3 Drawing Sheets

RETAINER CLIP

FIELD OF THE INVENTION

This invention relates to fasteners for holding two or more parts together including but not limited to latches of the type having an engagement arm.

BACKGROUND OF THE INVENTION

Automotive assemblies involve two or more parts held together by a latch. The latch components may be formed of the same material used to make the parts themselves. Often the parts are made of a resilient material to withstand moisture, temperature swings and vibration. If the latch fails, the assembly will come apart.

The force holding the latch in the latch position is usually a function of the resiliency of the material and the length of the engagement portion. The material is selected for the purpose of the assembly. After time, exposure to vibration, moisture and temperature extremes, the elasticity of a material may change. This change may affect the ability of the latch to hold the assembly together.

Solutions to re-secure the assembly may involve external latches or fasteners. Often confined space and high labor costs prohibit these fixes. Complete removal and replacement of the assembly may not be practical.

Accordingly, there is a need for a device to quickly and easily attach to an assembly to support the latch and hold the engagement arm in the latched position without making the assembly larger.

SUMMARY OF THE INVENTION

The invention provides a device to support a latch having a resilient engagement arm on a first latch member and a mating portion on a second latch member. The engagement arm is held in a latched position by the spring force of the engagement arm. A removable, retainer clip is attached to the first latch member to urge the engagement arm into a latched position. The retainer clip is shaped and sized to attach to the first latch member. The retainer clip bears against the engagement arm to reduce the length of the unsupported engagement arm. The shortened effective engagement arm length and the resiliency of the material thereby provide more force to hold the engagement arm in the latched position.

DESCRIPTION OF THE PREFERRED EMBODIMENT

The following describes a retainer clip that is useful, for example, on automotive applications. The retainer clip is attached to the first latch member to support the latching mechanism. The retainer clip is retained to prevent it falling off and losing effectiveness or falling into an area such as the workings of an internal combustion engine where the retainer clip may cause damage.

Figure 1:
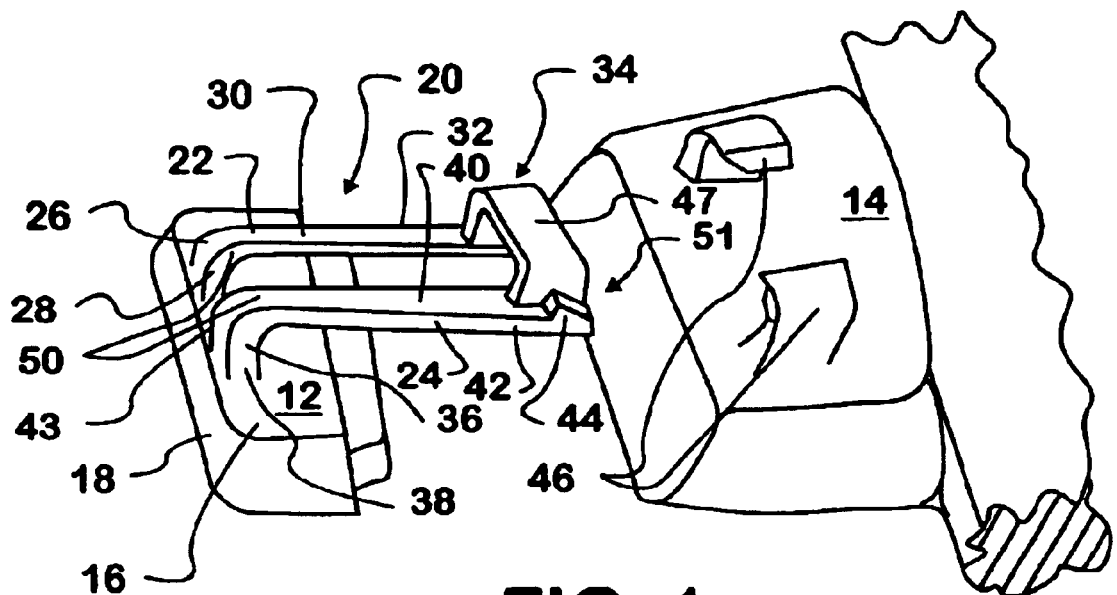
FIG. 1 is a perspective view of a two-part assembly having an integrally molded latch.

Referring now to the drawings in greater detail, FIG. 1 illustrates a two part assembly 10 having a first latch member 12 and a second latch member 14. The first latch member 12 has a top surface 16 and a front surface 18. On the top surface 16 is an engagement arm 20 illustrated as an L-shaped member formed as part of the first latch member 12.

The engagement arm 20 has a first strut 22 and a second strut 24. The first strut 22 has a first end 26 attached to the top surface 16 by a first foot 28. The first strut has a middle portion 30 and a second end 32 attached to a latching means 34. The second strut 24 has a first end 36 attached to the top surface 16 by a second foot 38. The second strut 24 has a middle portion 40 and a second end 42 attached to the latching means 34. An opening 43 is formed in the engagement arm 20 between the first strut 22 and the second strut 24.

The latching means 34 may be a catch 44 on each strut 22,24 to engage a mating portion 46 on the second latch member 14. A harness 47 joins the second end 32 of the first strut 22 to the second end 42 of the second strut 24. The engagement arm 20 has a pivot point 50 in the middle portion 30, 40. In an unflexed condition as shown in FIG. 1, the engagement arm 20 retains the latching means 34 in an unlatch position 51.

Figure 2:
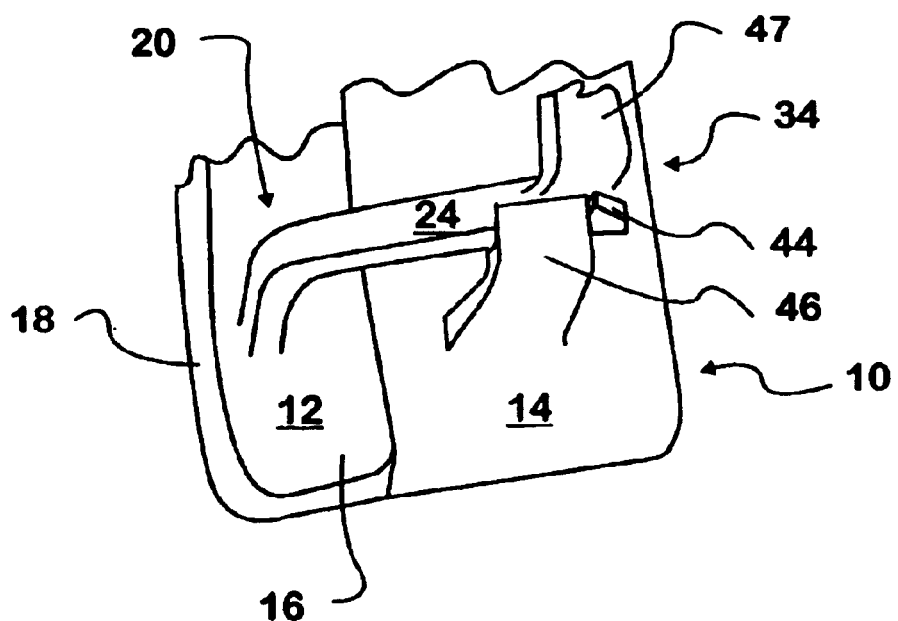
FIG. 2 is a perspective view of the latch of FIG. 1 engaged to hold the assembly together.

A latched view is shown in FIG. 2. The catch 44 is interlocked with the mating portion 46 to secure the first latch member 12 to the second latch member 14. The engagement arm 20 is held in a latch position 79. The catch 44 is urged into engagement with the mating portion 46 by the spring force of the engagement arm 20.

Figure 3:
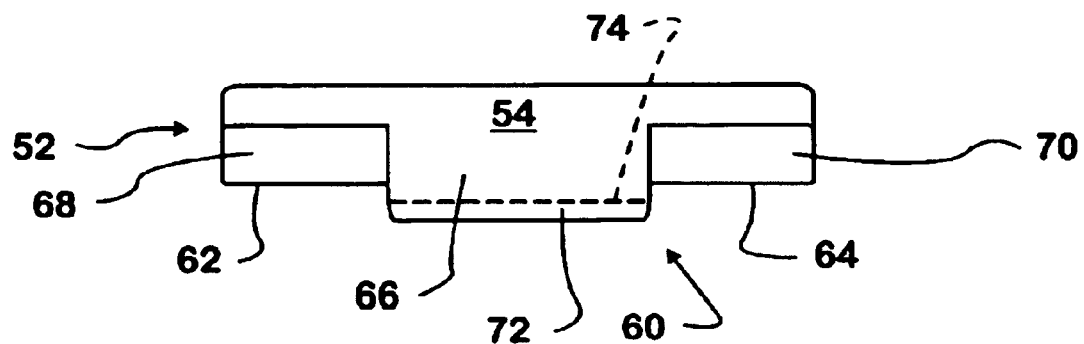
FIG. 3 is a top plan view of the retainer clip.

A top view of the retainer clip 52 is shown in FIG. 3. Support surface 54 and base 58 are spaced apart and separated by leading edge 60. The leading edge 60 comprises a first shoulder 62 and a second shoulder 64 and a tab 66. A first corner bevel 68 is on the leading edge 60 between the first shoulder 62 and the support surface 54. A second corner bevel 70 is on the leading edge 60 between the second shoulder 64 and the support surface 54.

Figure 4:
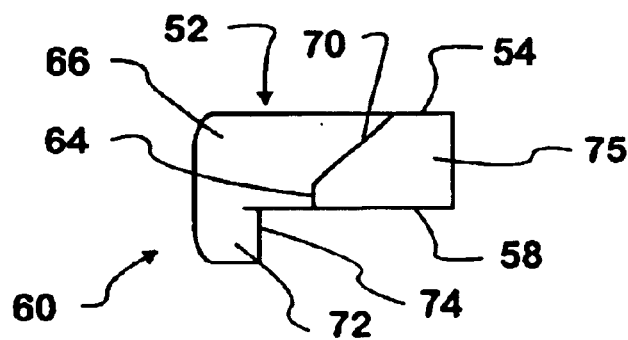
FIG. 4 is an end view of the retainer clip

A side view of the retainer clip 52 is shown in FIG. 4. Retaining lip 72 depends from tab 66. A grip surface 74 is shown opposing second shoulder 64. The second corner bevel 70 extends from the second shoulder 64 to the support surface 54

Figure 5:
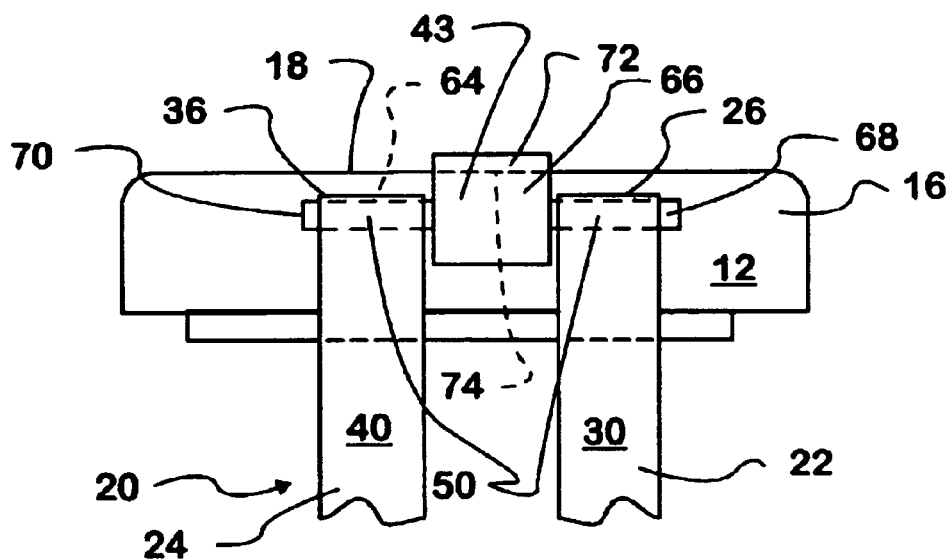
FIG. 5 is top plan view of the first latch member with the retainer clip attached.

The retainer clip 52 is shown attached to the first latch member 12 in FIG. 5. The first shoulder 62 bears against the first strut 24 of the engagement arm 20. The second shoulder 64 bears against the second strut 26 of the engagement arm 20.

The tab 66 fits into the opening 43 formed between the first strut 24 and the second strut 26. The retaining lip 72 engages the front surface 18 of the first latch member 12. The retainer clip 52 is held in place by gripping the first latch member 12 between the first and second shoulders 62, 64 and the retaining lip 72.

Figure 6:
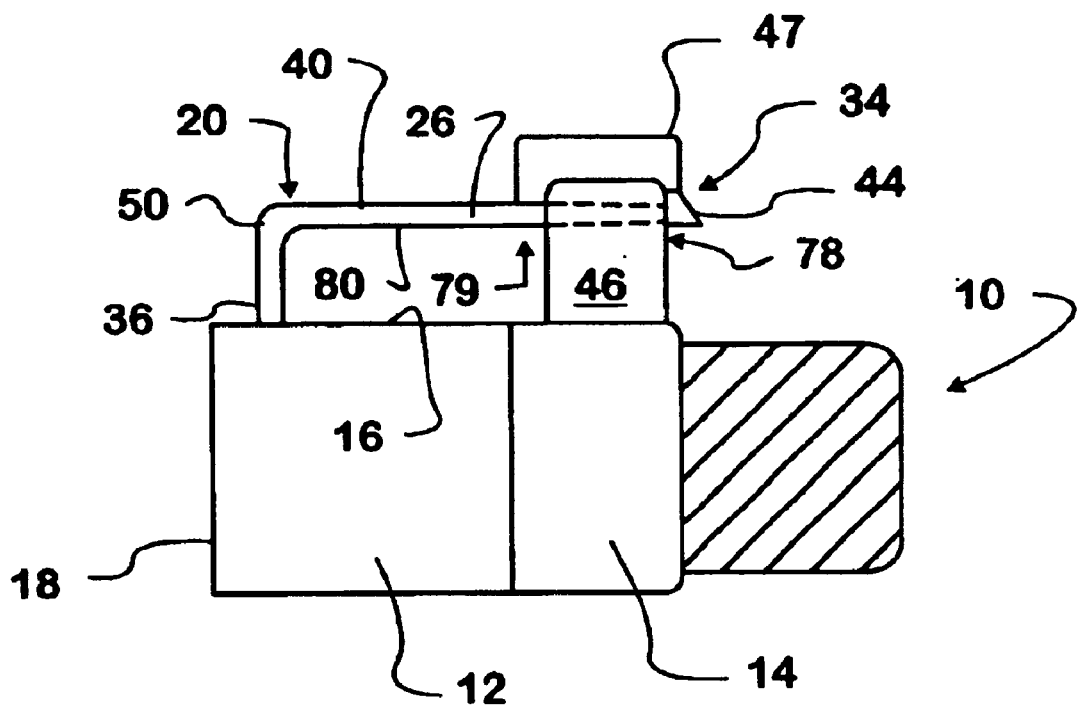
FIG. 6 is a side view of the assembly latched together without the retainer clip mounted on the first latch member.

An end view of the two-part assembly 10 without the retainer clip 52 is shown in FIG. 6. The latching means 34 is shown as catch 44 being urged into a latched position 78 fastened to the mating portion 46. The holding force 79 holding the catch 44 in the latched position 78 is a function of the resiliency of the engagement arm 20 and a first unsupported length 80 of the engagement arm 20 from the pivot point 50 to the latching means 34.

Figure 7:
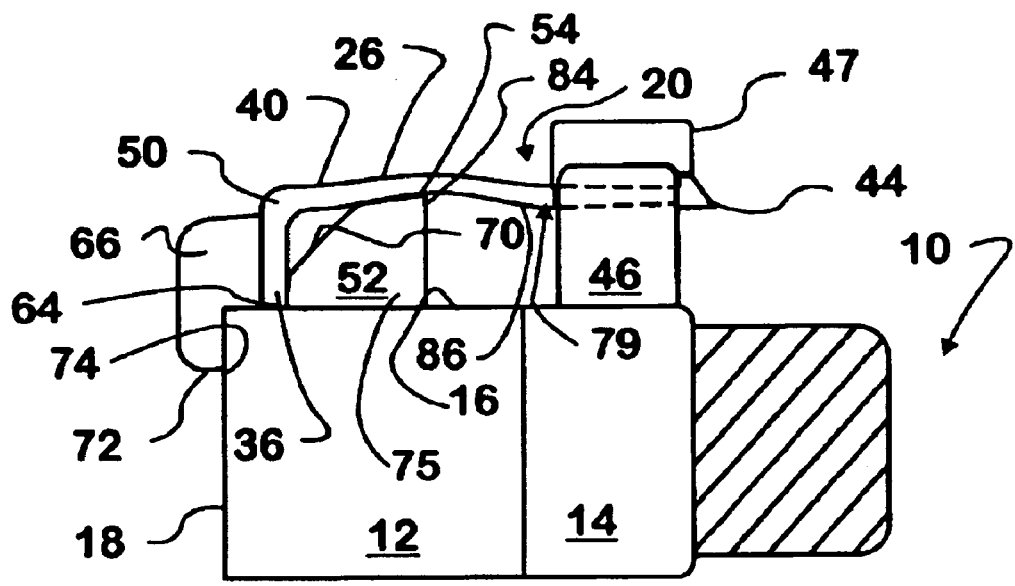
FIG. 7 is a side view of the assembly latched together with the retainer clip mounted on the first latch member.

An end view of the two-part assembly 10 with the retainer clip 52 is shown in FIG. 7. The grip surface 74 engages the front surface 18. Second corner bevel 70 positions the support surface 54 from the pivot point 50. Retainer clip 52 is preferably made of a resilient material 75.

Holding force 79 retaining the catch 44 in engagement with the mating portion 46 is increased by support surface 54 bearing against the engagement arm 20 and urging it into the latched position 78. Support surface 54 beam against the engagement arm 20 at support point 84. The portion of the engagement arm 20 from the support point 84 to the latching means 34 defines second unsupported length 86. Second unsupported length 86 is shorter than first unsupported length 80. Shorter, second unsupported length 86 provides greater holding force 79 than first unsupported length 80. The retainer clip 52 is pinned under the engagement arm 20 to prevent separation from the first latch member 12.

The present invention provides a number of advantages. The retainer clip 52 may be molded in a single shot to reduce manufacturing costs. The present invention does not require modifying the parts of the assembly for use. The present invention allows for the use of existing latches, thus existing latches may be easily and quickly retrofitted with the present invention. The present invention does not require special tools for application.

The present invention may be embodied in other specific forms without departing from its spirit or essential characteristics. The described embodiments are to be considered in all respects only as illustrative and not restrictive. The scope of the invention is, therefore, indicated by the appended claims rather than the foregoing description. All changes that come within the meaning and range of equivalency on the claims are to be embraced within their scope.

What is claimed is:

1. In combination with a latching assembly of the type having a first latch member comprising latching member base and a resilient engagement arm formed thereon and extending spaced latch member adapted to be engaged and latched by said engagement arm latching means, a retainer clip for maintaining said engagement arm and second latch member in engagement comprising:

a base on the retainer clip disposed in engagement with said latching member base;

a support surface on the retainer clip, the memory surface spaced from the retainer clip base; and a leading edge comprising a tab on the retainer clip, the leading edge disposed in engagement with said first latch member;

the retainer clip being disposed between said latching member base and said engagement arm, said support surface bearing against the engagement arm between said latching member base and said latching means and disposed prevent disengagement of said first and second latching members wherein the leading edge campuses a first shoulder having a first corner bevel and a second shoulder having a second corner bevel, the tab disposed between the first shoulder and the second shoulder.

2. The retainer clip of claim 1 wherein the tab comprises a retaining lip with a grip surface for engaging the first latch member.

3. In combination with a latching device including a first latch member having an outer surface and a flexible engagement arm depending from the outer surface, the engagement arm having a latching means, a retainer clip comprising:

a base on the retainer clip disposed in engagement with said outer surface;

a support surface on the retainer clip, the support surface spaced from the base;

a leading edge on the retainer clip, the leading edge disposed in engagement with said first latch member; and a tab on the leading edge;

the retainer clip being disposed between thee first latch member outer surface and the flexible engagement arm, the engagement arm having a latching means and an opening near the outer surface, the retainer clip having the tab in the opening, the support surface bearing against the engagement arm between the first latch member and the latching means to urge the latching means into a latch position.

4. The retainer clip of claim 3 wherein the tub comprises a retaining lip.

5. The retainer clip of claim 4 wherein the retaining lip comprises a pip surface.

6. The retainer clip of claim 3 where in the leading edge comprises a first shoulder and a second shoulder, the tab disposed between the first shoulder and the second shoulder.

7. The retainer clip of claim 6 wherein the tab comprises a retaining lip.

8. The retainer clip of claim 7 wherein the retainer clip is formed of a resilient material.

* * * * *